(12) United States Patent
Shvodian (10) Patent No.: US 7,447,503 B2
(45) Date of Patent: Nov. 4, 2008

(54) METHOD OF DESIGNATING A FUTURE NETWORK COORDINATOR

(75) Inventor: William M. Shvodian, McLean, VA (US)

(73) Assignee: Freescale Semiconductor, Inc., Austin, TX (US)

( * ) Notice: Subject to any disclaimer, the term of this patent is extended or adjusted under 35 U.S.C. 154(b) by 550 days.

(21) Appl. No.: 11/077,001

(22) Filed: Mar. 11, 2005

(65) Prior Publication Data
US 2006/0206601 A1    Sep. 14, 2006

(51) Int. Cl.
*H04Q 7/20*    (2006.01)
(52) U.S. Cl. .................. 455/435.2; 455/41.2; 455/41.3; 455/432.1; 455/435.1; 455/403; 455/435.3; 370/328; 370/329; 370/338
(58) Field of Classification Search ................ 455/41.2, 455/41.3, 432.1, 435.1, 435.2, 403, 450, 455/452.1, 452.2; 379/328, 329, 330, 338
See application file for complete search history.

(56) References Cited

U.S. PATENT DOCUMENTS

| | | | |
|---|---|---|---|
| 6,721,289 | B1 | 4/2004 | O'Toole et al. |
| 6,980,522 | B2 * | 12/2005 | Boyle ......................... 370/252 |
| 2002/0044549 | A1 * | 4/2002 | Johansson et al. .......... 370/386 |
| 2002/0055978 | A1 * | 5/2002 | Joon-Bo et al. ............. 709/209 |
| 2002/0159401 | A1 * | 10/2002 | Boger ......................... 370/294 |
| 2003/0018744 | A1 * | 1/2003 | Johanson et al. ............ 709/217 |
| 2004/0174829 | A1 | 9/2004 | Ayyagari |
| 2004/0208144 | A1 | 10/2004 | Vinayakray-Jani |
| 2005/0014467 | A1 * | 1/2005 | Ishiwata et al. ............... 455/39 |
| 2005/0063419 | A1 * | 3/2005 | Schrader et al. ............ 370/466 |
| 2005/0086273 | A1 * | 4/2005 | Loebbert et al. ............ 707/204 |
| 2005/0176455 | A1 * | 8/2005 | Krishnan et al. ............ 455/522 |

OTHER PUBLICATIONS

IEEE 802.15.3 Standard (Part 15.3) Wireless MAC and PHY Specifications for High Rate Wireless PANs, IEEE Society publisher, Sep. 23, 2003, selected pp. (eg. 1-2, 4, 7-9, 11-13 and 149-154) Entire document can be viewed online at: http://standards.ieee.org/getieee802/download/802. 15.3-2003.pdf.*
International Search Report and Written Opinion.

* cited by examiner

*Primary Examiner*—Stephen M D'Agosta (57) ABSTRACT

A method (500) is provided for operating a network coordinator (110). The method includes receiving device capability information from a plurality of network devices (121-125), including whether each of the network devices can perform network control functions (520); determining whether any of the network devices is capable of performing network control functions based on the device capability information (540); choosing one of the network devices that is capable of performing network control functions to be a designated next coordinator if any of the network devices are capable of performing network control functions (570); determining that there will be no designated next coordinator if none of the network devices are capable of performing network control functions (550); and sending a beacon (220) to the network devices, the beacon including next coordinator information (300) indicating one of: the designated next coordinator, or that there is no designated next coordinator (580).

19 Claims, 5 Drawing Sheets

METHOD OF DESIGNATING A FUTURE NETWORK COORDINATOR

FIELD OF THE INVENTION

The present invention relates in general to the operation of a wireless network, and more particularly to a method of accommodating the loss of a network coordinator by designating a device that will take over as the network coordinator if the current coordinator exits without a proper coordinator handoff.

BACKGROUND OF THE INVENTION

Some wireless networks are centrally controlled, with a single device coordinating the operation of all of the devices in the network. This central coordinator provides instructions to each of the devices regarding transmission times, power levels, and the like. One example of this sort of network is a piconet using the proposed IEEE 802.15.3 standard.

In certain ad hoc networks, there may be no specific device that must be a coordinator, but rather one device may be chosen from among all of the available devices to perform the functions required of a network coordinator. And if this device leaves the network for any reason, another network device can take over the functions of a network coordinator.

Typically when a current network coordinator identifies a device more capable of performing network control functions or when the current network coordinator knows that it will be leaving a network, it will arrange to hand off the duties of a network coordinator to another device. In this way, the new coordinator will be able to step in and take over the duties of the current network coordinator as soon as the current coordinator leaves the network (or otherwise ceases to be able to function as a network coordinator). The new network coordinator can then continue to provide the remaining devices with their required instructions, keeping the network functioning properly.

However, the hand-off process requires that the current network coordinator know when it will be ceasing its network control function so that it can perform the hand-off process to the new coordinator. And this hand-off procedure requires a certain amount of lead time so that the current coordinator can provide instructions to the new coordinator, and so that the new coordinator can begin performing its network control functions.

Unfortunately in some circumstances the network coordinator does not have advanced warning that it will be unable to perform its network control duties. For example, if a network control device is quickly powered down (e.g., it suddenly loses its power supply) without performing a proper shut down procedure, or if a mobile device is moved out of the range of the other devices the device might not have adequate time to perform the necessary hand-off functions.

In such a case, the network would be deprived of a network coordinator and would ultimately collapse. Without receiving controlling instructions, individual devices would each eventually drop from the network until none were left. It might then be possible for one of the network devices to start a new network, which the other devices could then join. However, this would involve wasted time waiting for the old network to collapse and starting the new network. It also runs the risk that multiple devices will all try and start new networks as new network coordinators, and that they will try and start new networks using the same network identifier.

BRIEF DESCRIPTION OF THE DRAWINGS

The accompanying figures where like reference numerals refer to identical or functionally similar elements and which together with the detailed description below are incorporated in and form part of the specification, serve to further illustrate an exemplary embodiment and to explain various principles and advantages in accordance with the present invention.

DETAILED DESCRIPTION

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or integrated circuits (ICs), such as a embedded processor and software therefore or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the exemplary embodiments.

Wireless Network

Figure 1:
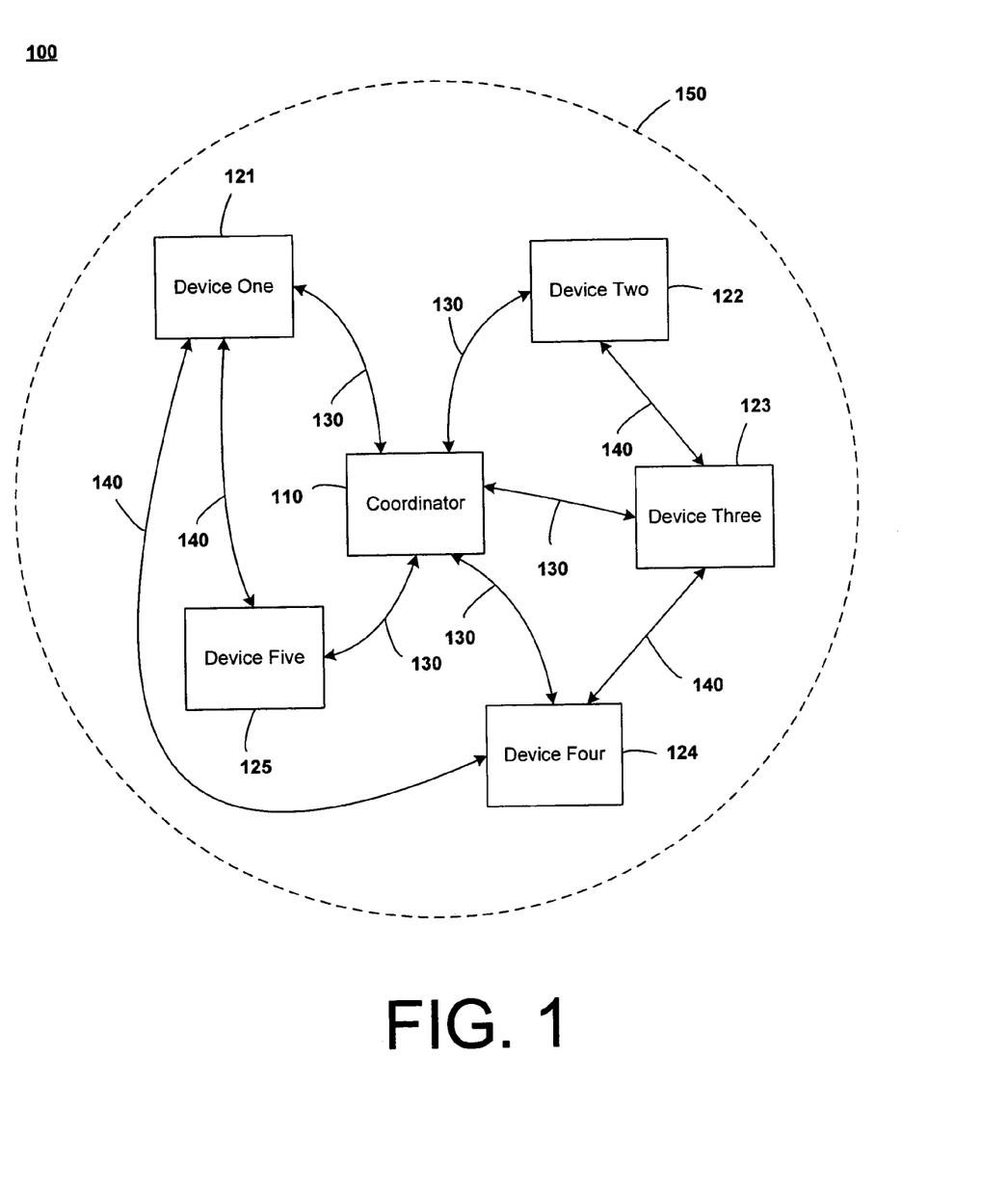
FIG. 1 is a block diagram of a wireless network according to a disclosed embodiment of the present invention.

FIG. 1 is a block diagram of a wireless network 100 according to a disclosed embodiment of the present invention. In this embodiment the network 100 is a wireless personal area network (WPAN), or piconet. However, it should be understood that the present invention also applies to other settings where bandwidth is to be shared among several users, such as, for example, wireless local area networks (WLAN), or any other appropriate wired or wireless network.

When the term piconet is used, it refers to a wireless network of devices connected in an ad hoc fashion, having one device act as a coordinator (i.e., it functions as a master) while the other devices (sometimes called stations) follow the time allocation instructions of the coordinator (i.e., they function as slaves). The coordinator can be a designated device, or simply one of the devices chosen to function as a coordinator. One primary difference between the coordinator and non-coordinator devices is that the coordinator must be able to communicate with all of the devices in the network, while the various non-coordinator devices need not be able to communicate with all of the other non-coordinator devices.

As shown in FIG. 1, the network 100 includes a coordinator 110 and a plurality of devices 121-125. The coordinator 110 serves to control the operation of the network 100. As noted above, the system of coordinator 110 and devices 121-125 may be called a piconet, in which case the coordinator 110 may be referred to as a piconet coordinator (PNC). Each of the non-coordinator devices 121-125 must be connected to the coordinator 110 via primary wireless links 130, and may also be connected to one or more other non-coordinator devices 121-125 via secondary wireless links 140, also called peer-to-peer links.

In addition, although FIG. 1 shows bi-directional links between devices, they could also be shown as unidirectional links. In this case, each bi-directional link 130, 140 could be shown as two unidirectional links, the first going in one direction and the second going in the opposite direction.

In some embodiments the coordinator 110 may be the same sort of device as any of the non-coordinator devices 121-125, except with the additional functionality for coordinating the system, and the requirement that it communicates with every device 121-125 in the network 100. In other embodiments the coordinator 110 may be a separate designated control unit that does not function as one of the devices 121-125.

In some embodiments the coordinator 110 will be a device just like the non-coordinator devices 121-125. In other embodiments the coordinator 110 could be a separate device dedicated to that function. Furthermore, individual non-coordinator devices 121-125 could include the functional elements of a coordinator 110, but not use them, functioning as non-coordinator devices. This could be the case where any device is a potential coordinator 110, but only one actually serves that function in a given network.

Each device of the network 100 may be a different wireless device, for example, a digital still camera, a digital video camera, a personal data assistant (PDA), a digital music player, or other personal wireless device.

The various non-coordinator devices 121-125 are confined to a usable physical area 150, which is set based on the extent to which the coordinator 110 can successfully communicate with each of the non-coordinator devices 121-125. Any non-coordinator device 121-125 that is able to communicate with the coordinator 110 (and vice versa) is within the usable area 150 of the network 100. As noted, however, it is not necessary for every non-coordinator device 121-125 in the network 100 to communicate with every other non-coordinator device 121-125.

Although a wireless network is described with reference to FIG. 1, and the disclosure refers to this wireless network by way of example, the current claimed invention is equally applicable to wired networks. By way of example the present claimed invention could be applied to wireless networks of the sort defined by the IEEE 802.11 standard or the IEEE 803.15.3 standard, the proposed IEEE 802.15.3b standard, by a wired Ethernet network, or by any other suitable wired or wireless network.

Superframes

The available bandwidth in a given network 100 may be split up in time by the coordinator 110 into a series of repeated superframes. These superframes define how the available transmission time is split up among various tasks. Individual frames of data are then transferred within these superframes in accordance with the timing set forth in the superframe.

Figure 2:
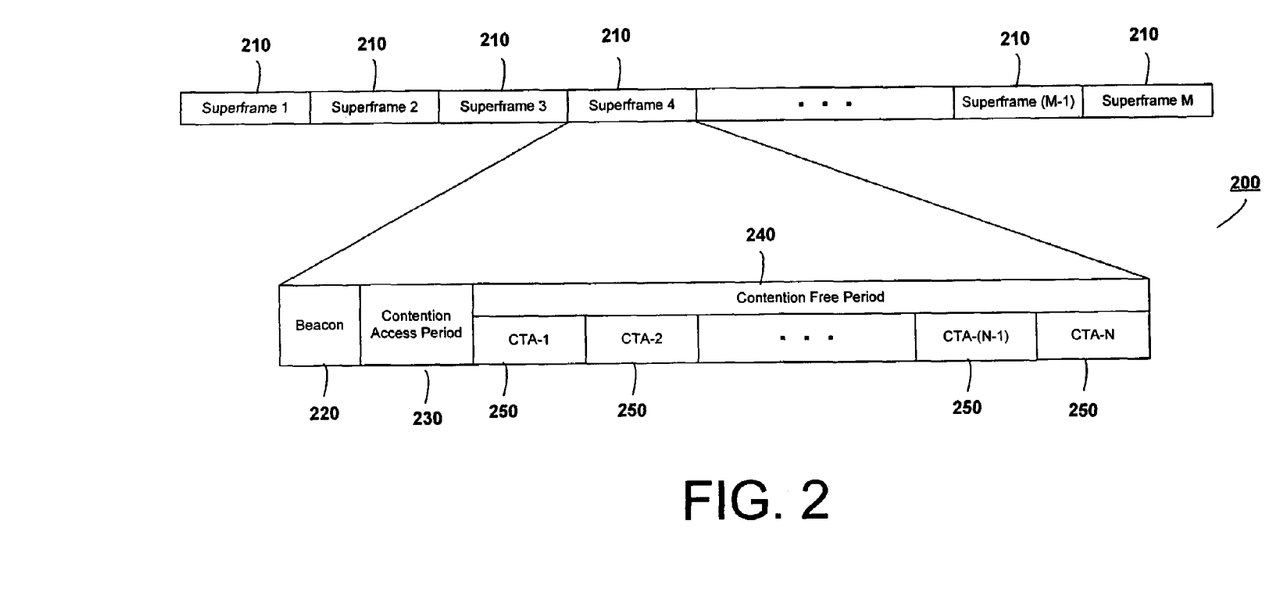
FIG. 2 is a block diagram of a TDMA scheme including superframes, according to a disclosed embodiment of the present invention.

FIG. 2 is a block diagram of a TDMA scheme including superframes and channel time allocations according to a disclosed embodiment of the present invention. As shown in FIG. 2, the available transmission time 200 is broken up into a plurality of consecutive superframes 210. Each individual superframe 210 in this embodiment includes a beacon period 220, a contention access period (CAP) 230, and a contention free period (CFP) 240. The contention free period 340 is further broken up into a plurality of channel time allocations 250 (also called time slots).

The beacon period 220 is set aside for the coordinator 110 to send a beacon frame out to the non-coordinator devices 121-125 in the network 100. Such a beacon frame will include information for organizing the operation of devices within the superframe 210. Each non-coordinator device 121-125 knows how to recognize a beacon period 220 prior to joining the network 100, and uses the beacon 220 both to identify an existing network 100 and to coordinate communication within the network 100.

The beacon frame provides information required by the devices 121-125 in the network 100 regarding how the individual channel time allocations 250 will be allocated. In particular, it notes how and when devices 110, 121-125 can transmit to prevent any two devices from interfering.

The CAP 230 is used to transmit commands or asynchronous data across the network 100. The CAP 230 may be eliminated in many embodiments and the system would then pass commands solely during the CFP 240.

CFP 240 includes a plurality of channel time allocations 250. These channel time allocations 250 are each assigned by the coordinator 110 to one or more transmitting devices 110, 121-125 and one or more receiving devices 110, 121-125 for transmission of information between them. Generally each transmitting device will have a single associated receiver, through in some cases a single transmitter will transmit to multiple receivers at the same time.

The channel time allocations 250 are provided to allow communication between devices 120, 121-125. They do so in accordance with the information set forth in the beacon 220. The size of the channel time allocations 250 can vary by embodiment, but it should be large enough to transmit one or more data frames.

Although the embodiments described in this document are in the context of a WPAN (or piconet), it should be understood that the present invention also applies to other settings where bandwidth is to be shared among several users, such as, for example, wireless local area networks (WLAN), other appropriate wireless network, or any wired or wireless transmission scheme in which bandwidth must be shared.

The superframes 210 are fixed time constructs that are repeated in time. The specific duration of the superframe 210 is described in the beacon 220. In fact, the beacon 220 generally includes information regarding how often the beacon 220 is repeated, which effectively corresponds to the duration of the superframe 210. The beacon 220 also contains information regarding the network 100, such as the identity of the transmitters and receivers assigned to each channel time allocation 250, the necessary transmission parameters for signals within a channel time allocation 250, and the identity of the coordinator 110.

The system clock for the network 100 is preferably synchronized through the generation and reception of the beacons 220. Each non-coordinator device 121-125 will store a synchronization point time upon successful reception of a valid beacon 220, and will then use this synchronization point time to adjust its own timing.

Designation of a Next Coordinator

When operating a network as described above with respect to FIGS. 1 and 2, it is possible to designate a next network coordinator device during operation, which device will presumptively take over as a new network coordinator should the current network coordinator drop out of the network for any reason.

This designation of a next network coordinator can be achieved by having the current network coordinator consider all of the available devices for their suitability as a network coordinator, choose the best available device, and inform the remainder of the devices by a broadcast message, such as in a network beacon 220.

The primary criterion for a designated next network coordinator is that the device be capable of operating as a coordinator. As noted above, some devices may only be capable of operating as a non-coordinator device in a network, while others may have the capability of operating as a coordinator if given that task. Clearly, the current network coordinator can only designate as a next network coordinator a device is capable of performing the required network coordinator functions.

One way for the current coordinator to determine the capabilities of the devices in its network is to require that the devices pass that information to the current coordinator either periodically or when they first join the network. An alternate way to determine the capabilities of the devices would be for the current coordinator to periodically poll the devices in the network to determine their capabilities. Regardless, the coordinator can maintain a database of device capabilities, allowing it to determine the subset of network devices that can be considered for a designated next coordinator.

If there are no coordinator-capable devices in the network, the current coordinator will determine that there is no designated next network coordinator, and indicate the same to the other devices in the network.

If there is only one coordinator-capable device in the network, the current coordinator will set that device to be the designated next network coordinator, and indicate the same to the other devices in the network.

If, however, there are multiple coordinator-capable devices in the network, the current coordinator can consider other criteria in determining which should be designated as the next network coordinator. One set of criteria that is of high importance is how many other network devices that each coordinator-capable device can hear, and what other devices can hear each coordinator-capable device. This is important because should the designated next network coordinator take over as network coordinator, it can only service those devices that it can hear and which can hear it. Therefore, the current coordinator can also keep a database of which devices can hear each other to assist it in deciding which device will be designated as the next network coordinator.

One way to obtain this connectivity data is to have each device periodically send the current network coordinator a set of network channel status information indicating which devices it can hear. In some embodiments this network channel status information can be included as a command sent to the current network coordinator in a management channel time allocation (sometimes referred to as a management time frame). In others it can be sent as a management frame during the CAP 230.

Making the network channel status information part of a management frame can be advantageous because in many networks each non-coordinator network device must periodically transmit a management frame to the current network coordinator (e.g., at least once per association time out period (ATP)) even if it has nothing else to send. This is to inform the current network coordinator that the device is still associated with the network.

Figure 3:
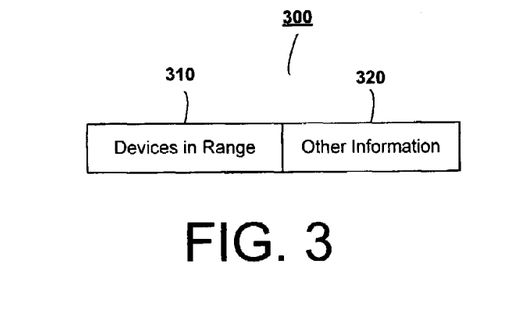
FIG. 3 is a block diagram of a network channel status command according to a disclosed embodiment of the present invention.

FIG. 3 is a block diagram of a network channel status command according to a disclosed embodiment of the present invention. As shown in FIG. 3, the network channel status command 300 includes devices-in-range information 310 and other information 320.

The devices-in-range information 310 includes the network channel status information regarding what other devices the transmitting device can hear. In some embodiments this can be a bit map representation of the network indicating what devices can be heard and what devices can't be heard. For example, if a network has eight devices, the representation 11001010 could represent that the first, second, fifth, and seventh devices can be heard, while the third, fourth, sixth, and eighth devices cannot be heard. Alternate embodiments can alter the bitmap representation such that the role of 1's and 0's was reversed, or could use another data representation completely.

In other embodiments more than a single bit can be used to represent each other device. In this case additional information can be provided with respect to the reception of those devices. For example, the devices-in-range information 310 could include an indicator of not only what devices a transmitting device can hear, but an indicator of how well it can hear those devices. In various embodiments the indicator of how well the transmitting device can hear other devices can be quantified based on metrics such as bit error rate (BER) packet error rate (PER), frame error rate (FER), signal strength, or the like.

The other information 320 can include an indicator of the command type, an indicator of the length of the network channel status command 300, or anything else that the network requires.

In order to obtain the network channel status information, each non-coordinator network device must be able to periodically listen to each other device in the network. One possible way to achieve this is to have each device listen to all management channel time allocations (i.e., all management time slots), if such are used in that embodiment. Another way is to have each device listen to the entire CAP 230 in embodiments that employ a CAP 230. Since these are times allocated for non-coordinator devices to pass management data with the network coordinator, non-coordinator devices will be also to listen when other devices are transmitting such data. And by doing this, the devices can keep track of which other devices they can hear and in some cases, how well they can hear those other devices.

If a device can be set to listen during all of the times allocated in a given embodiment for the passing of management data between non-coordinator devices and the network coordinator, it will be guaranteed to be listen to at least some transmissions by each device. And if the non-coordinator devices are required to transmit a management frame at least once every ATP, then each device is guaranteed to be listening during a transmission from every other device at least once every ATP as well.

Alternate embodiments, however, can employ different methods to obtain the network channel status information. For example, if power is not an issue, the non-coordinator devices can listen all the time, guaranteeing that they will be listening during all transmissions.

In addition, in some embodiments the non-coordinator devices can also provide device capability information along with the network channel status information. This could be in the network channel status command 300, or in a separate command contained in the management time frame.

Although the above description discloses several specific ways in which the network channel status information and the device capability information can be received and compiled by the current network coordinator, alternate mechanisms can be employed. Non-coordinator devices can send network channel status information and device capability information in a variety of formats, and through a variety of mechanisms, and at a variety of times.

Regardless of the format of the network channel status command, however, once the current network coordinator has received the network channel status information from each of the non-coordinator devices, it can determine which of the coordinator-capable non-coordinator devices has the best device coverage, and thus would be the best replacement as network coordinator. The current coordinator can compile all of the network channel status information from each of the devices into a map of which device can hear which other device at any given time.

In addition, the current coordinator could maintain additional information about connectivity between devices. This could include a history of the connectivity to show not only which devices currently have the greatest connectivity, but which have historically had the best connectivity. It could also include data about the BER, PER, signal strength, etc. of the connections between devices to allow quantitative measurement of the quality of connections between devices as well as simply their existence.

The current coordinator can then use this stored information to choose a non-coordinator network device that it considers best suited to be the next coordinator and can send an indication of this choice out to the network. Then each device will know how it should operate if the current network coordinator falls out of the network. The designated next network coordinator takes over the operation of the network, and the other non-coordinator devices wait for the designated next network coordinator. In this way the network can be maintained with a minimum of lost time, and there will be a reduced chance of multiple devices trying to start a new network at the same time.

One simple way for the current network coordinator to pass the information regarding the designated next network coordinator to all of the non-coordinator devices is through the beacon 220. In particular, the current network coordinator could pass a next coordinator information element in the beacon 220, providing information regarding the designated next coordinator, and the network it should run. Each non-coordinator device already must listen to the beacon 220, so this imposes a minimum of overhead on the devices.

Figure 4:
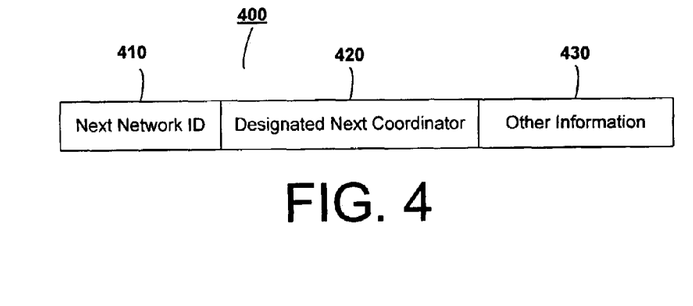
FIG. 4 is a block diagram of a next coordinator information element according to a disclosed embodiment of the present invention.

FIG. 4 is a block diagram of a next coordinator information element according to a disclosed embodiment of the present invention. As shown in FIG. 4, the next coordinator information element 400 includes a next network identifier 410, a designated next coordinator identifier 420, and other information 430.

The next network identifier 410 indicates the network identifier that the designated next network coordinator should use should it be required to take over as the network coordinator. In the disclosed embodiment this will be a different identifier that will both allow the designated next network coordinator to know what network identifier to use and will also allow the other network devices to know what beacons (which are identified by network identifier) they should listen to. In this embodiment, devices know that should they stop receiving beacons using the current network identifier, they should also respond to beacons using the next network identifier 410. This will also ensure that if the designated next network coordinator incorrectly starts a new network while the current network coordinator is still operating, the two networks will not interfere with each other.

In alternate embodiments, however, the next network identifier 410 could be the same identifier used in the current network.

The designated next coordinator identifier 420 indicates which device is the designated next network coordinator. In the disclosed embodiment the designated next coordinator identifier 420 is the device identifier for the device designated as the next network coordinator. However, alternate embodiments can use different identifying information.

The other information 430 can include an element identifier, an indicator of the length of the next coordinator information element 400, or anything else that the network requires.

Of course, data reception can change due to a myriad of reasons, including local interference in the channel, movement of devices with respect to each other, changes in transmission power, etc. As a result, the disclosed embodiment will periodically reevaluate which non-coordinator device is best suited to being the designated next network coordinator. This can include updating the stored device capability data in the network coordinator, updating the network channel status information stored in the network coordinator, and identifying a new designated next network coordinator when warranted by changing circumstances.

In one disclosed embodiment a next coordinator information element 400 should be included in a beacon 220 periodically (e.g., at least once every ATP). Alternate embodiments could include a next coordinator information element 400 in a beacon 220 more or less frequently. In some embodiments every beacon 220 could include a next coordinator information element 400. In others, they could be less frequent.

In order to function properly, the designated next coordinator must understand the appropriate criteria used to determine when it should consider that the current network coordinator has dropped out, i.e., when it should take over and start operating as the next network coordinator.

In one disclosed embodiment this is achieved by having the designated next network coordinator monitor how many beacons 220 in a row it has failed to receive from the current network coordinator. Once this reaches a set threshold, the designated next network coordinator may consider the current network coordinator dropped from the network.

Certain precautions can then be taken to make certain that designated next network coordinator is not the device that has fallen out of communication with a still-operating current network coordinator. For example, after having missed the set number of beacons 220, the designated next network coordinator could begin a scan of the channel. If the current network coordinator has really dropped out, then the rest of the devices in the network will also have failed to receive the beacon 220. And failing to receive the beacon 220, they will not be able to transmit during the superframe 210. Although in some embodiments devices may be able to transmit in some channel time allocations for a number of superframes without hearing a beacon 220, this is generally limited and should not seriously interfere with this added network scan. In fact, in embodiments where such transmissions are permitted, the designated next network coordinator may be able to take these transmissions into account when scanning the channel.

Thus, if the designated next network coordinator can hear other devices transmitting during the CAP 230 or the CFP 240, then the beacon is clearly being transmitted and the designated next network coordinator has lost contact with the current network coordinator. In this case, the designated next network coordinator should consider itself dropped out of the network and take appropriate action.

If, however, nothing is heard during the channel scan, then the designated next network coordinator can conclude that the current network coordinator has dropped, and can proceed with taking over as the new network coordinator.

In addition, the designated next network coordinator may take steps to avoid interfering with a still-operating current network coordinator, just in case it is still operating. For example, the designated next network coordinator could purposely start its new beacon 220 after a time it would have expected a beacon 220 from the original (formerly current) network coordinator. This is so that if the original network coordinator is still transmitting, though under circumstances that the designated next coordinator can't hear it (e.g., the designated next network coordinator has moved out of range of the current network coordinator), the beacons transmitted by each will not collide.

Operation of a Current Coordinator

Figure 5:
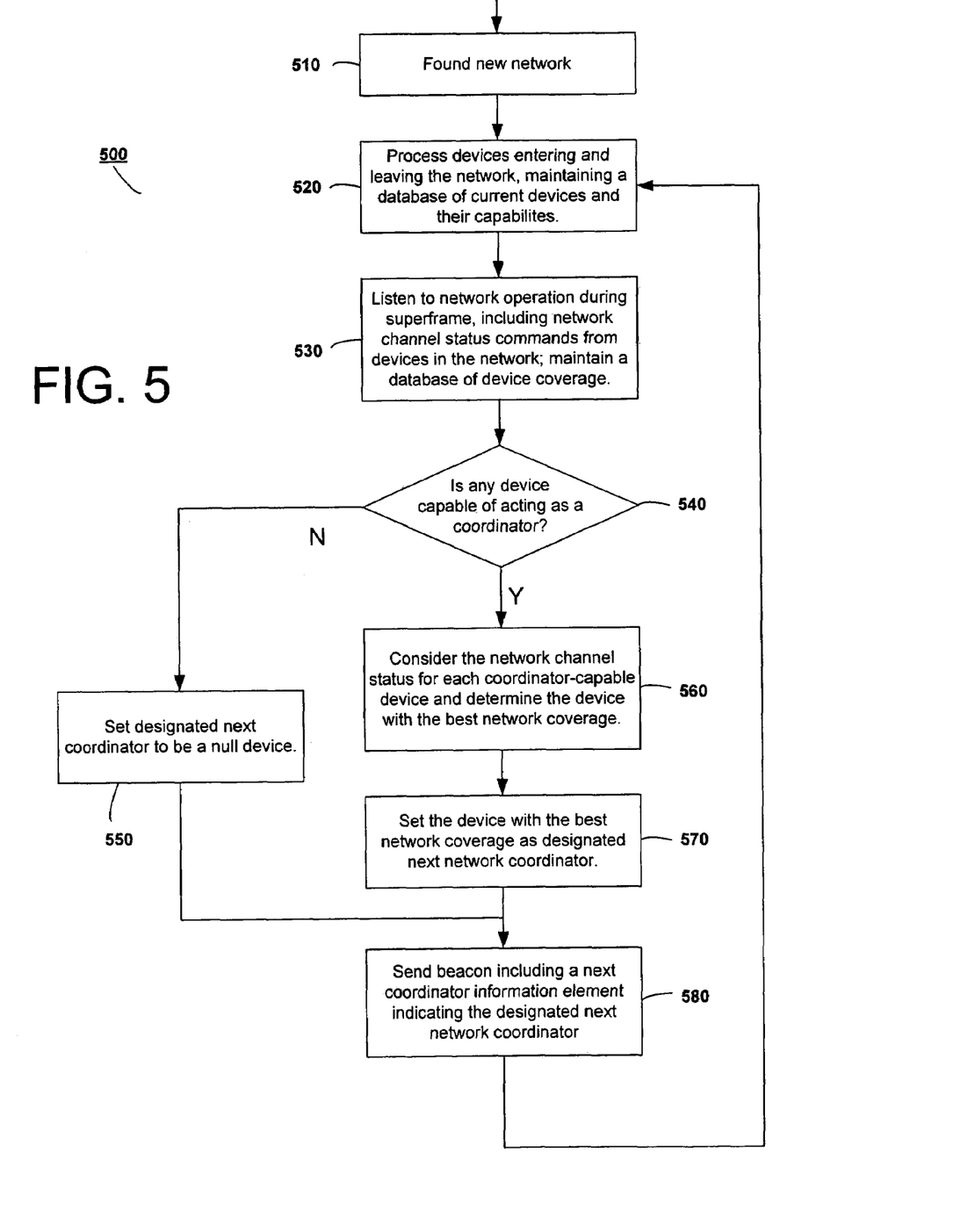
FIG. 5 is a flow chart of the operation of a network coordinator according to a disclosed embodiment of the present invention.

FIG. 5 is a flow chart of the operation of a network coordinator according to a disclosed embodiment of the present invention.

As shown in FIG. 5, the network coordinator begins when it founds a new network. (510) This new network can be a fresh network or a network recovered from a previous network coordinator that dropped. In the case of a recovered network, the founding of a new network might not include association requests or authentication, but may bring over the device associations from the previous network coordinator.

The current network coordinator then processes devices entering and leaving the network, maintaining a database of current devices and their capabilities. (520) As noted above, device capabilities can include whether the device is capable of acting as a network coordinator. These device capabilities can also be updated periodically during network processing in some embodiments.

The current network coordinator then listens to network operations during each superframe 210, including network channel status commands that it may receive from devices in the network. With this information, the current network coordinator maintains a database of device coverage. (530)

At some point during operation (e.g., once every ATP), the current network coordinator will need to designate a next network coordinator. It starts by determining whether any non-coordinator device in the network is capable of acting as a coordinator. (540)

If there are no other coordinator-capable devices in the network, the current network coordinator sets the designated next network coordinator to be a null device. (550) This can be implemented by having the current network coordinator set the device identifier for the designated next network coordinator to be a null value, by setting a flag to indicate that there is no designated next network coordinator, or any other desired means of so indicating.

If there are other coordinator-capable devices in the network, the current network coordinator considers the network channel status for each coordinator-capable device and determines which device has the best coverage of other devices in the network. (560) Then the current network coordinator sets the non-coordinator device with the best network coverage as the designated next network coordinator. (570) If multiple devices have similar coverage, the current network coordinator can turn to other metrics (e.g., signal quality metrics) to determine which would be the best next coordinator Once the current network coordinator has either determined that there is no designated next network coordinator (550) or has set the designated next network coordinator as one of the non-coordinator device in the network (570), the current network coordinator sends out a beacon 220 including a next coordinator information element that indicates the designated next network coordinator. (580)

Finally, the current network coordinator returns to processing devices (520) and listening to network operation (530) until it is time to send the next beacon identifying a designated next network coordinator.

Although in the above embodiment it is shown that the process for determining a designated next network coordinator is only performed immediately prior to sending out a beacon identifying the designated next network coordinator, alternate embodiments can perform this determination process at different times. For example, the current network coordinator could continually update its choice for the designated next network coordinator and simply send it out periodically. Or that information could be sent out each beacon, meaning that the determination is made every superframe.

In particular, a disclosed method of operating a network coordinator can include: receiving device capability information from a plurality of network devices, including whether each of the plurality of network devices can perform network control functions; determining whether any of the plurality of network devices is capable of performing network control functions based on the device capability information; choosing one of the plurality of network devices that is capable of performing network control functions to be a designated next coordinator if any of the plurality of network devices are capable of performing network control functions; determining that there will be no designated next coordinator if none of the plurality of network devices are capable of performing network control functions; and sending a beacon to the plurality of network devices, the beacon including next coordinator information indicating one of: the designated next coordinator, or that there is no designated next coordinator.

The method may further include receiving network channel status information from one or more of the plurality of network devices, the network channel status information indicating which of the plurality of network devices are within range of a transmitting device. In this case, if any of the plurality of network devices is capable of performing network control functions, the choosing of one of the plurality of network devices that is capable of performing network control functions to be a designated next coordinator may be performed considering the network channel status information.

The network channel status information may include a bitmap representation of which of the plurality of network devices are within range of the transmitting device. The next coordinator information may include one of: a device identifier for the designated next coordinator, or a null value indicating no designated next coordinator. And the next coordinator information may also include a network identifier to be used by the designated next coordinator to create a new network.

The method is implemented in an ultra wideband device. The method may also be implemented in an integrated circuit.

Designation of a Device Not Designated as a Next Coordinator

Figure 6:
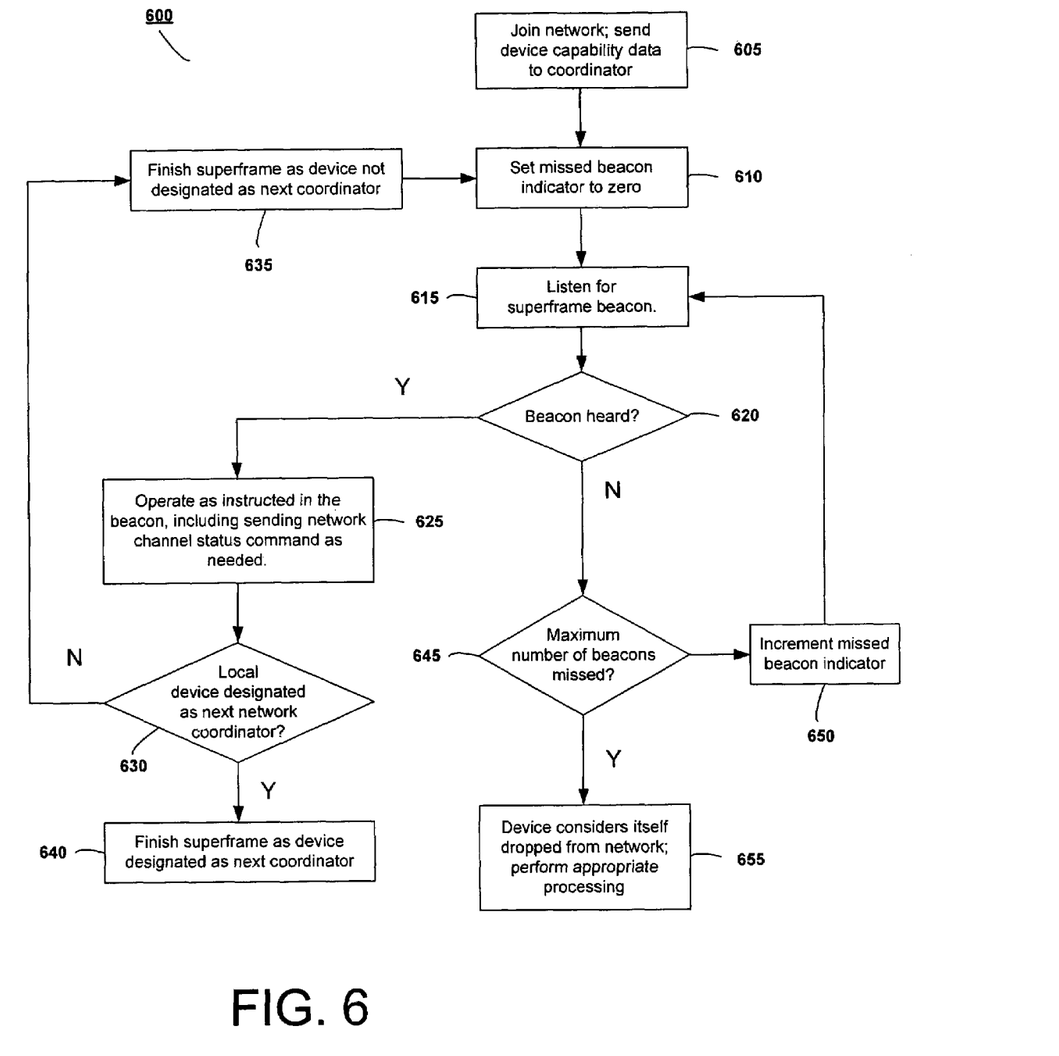
FIG. 6 is a flow chart of the operation of a device not designated as a next coordinator according to a disclosed embodiment of the present invention.

FIG. 6 is a flow chart of the operation of a device not designated as a next coordinator according to a disclosed embodiment of the present invention.

As shown in FIG. 6, operation starts when a device joins a network and sends device capability data to the current network coordinator. (605) Although in this embodiment the device sends device capability data upon joining, alternate embodiments could gather this data at a different time.

Upon joining, the device sets a missed beacon indicator to zero. (610) This indicates that upon joining the network, the device has missed receiving no beacons.

The device then listens for a superframe beacon 220 sent from the current network coordinator (615) and determines whether the beacon 220 is heard within a set time given for receiving the beacon. (620)

If the beacon 220 is heard, the device operates as instructed in the beacon. This includes using assigned channel time allocations, sending asynchronous frames in the CAP 230, and sending network channel status information as required. (625) As noted above with respect to FIG. 3, in the disclosed embodiment the network channel status information can be sent in a network channel status command in a management frame or in the CAP 230. However, alternate means of passing network channel status information may be employed.

The local device also determines whether the current network coordinator has designated it as the next network coordinator. (630)

If the local device has not been designated as the next network coordinator, then the device finishes the superframe as a device not designated as the next network coordinator (635), resets the missed beacon indicator to zero, if necessary (610), and returns to waiting for the next superframe beacon 220. (615) This lack of designation can occur either because another device was designated as the next network coordinator, because an explicit designation of no device as next network coordinator was made, or because no designation of the next network coordinator was made during the current beacon 220.

If the local device was designated as the next network coordinator, then the device finishes the superframe as a designated next network coordinator (640), and continues processing as a next network coordinator. (See description of FIG. 7 below.)

If while determining whether the beacon was properly received (620) the local device determines that no beacon was heard, the device then determines whether the maximum number of beacons have been missed. (670)

If the maximum number of beacons have not yet been missed, the local device simply increments the missed beacon indicator and starts listening for the next beacon 220. (615)

If, however, the maximum number of beacons have been missed, the device considers itself dropped from the network and performs the appropriate processing. (655) Because the device is not designated as the next network coordinator, it will not automatically try and take over the network in place of the current network coordinator.

However, appropriate processing when dropped from a network may involve looking for a new network or starting its own network. In the former case, if the current network coordinator has been dropped, the device may hear the designated next network coordinator send out a beacon in place of the prior (formerly current) network coordinator.

Although in this embodiment the number of missed beacons is incremented after the determination as to whether the maximum number of beacons were missed, in alternate embodiments it could be incremented prior to the determination as to whether the maximum number of beacons were missed. In either case the threshold should be set accordingly to account for the placement of the incrementing.

In a particular disclosed embodiment, a method of operating a network device is provided that includes: listening for a beacon from a network coordinator; determining whether the beacon has been successfully received; determining whether the beacon indicates that the network device is a designated next network coordinator; and storing a next device indicator indicating that the network device is the designated next network coordinator if the beacon indicates that the network device is the designated next network coordinator.

The method may further include operating in a superframe in accordance with instructions in the beacon, when the beacon has been successfully received. In this case, while operating in the superframe, the network device may send network channel status information to the network coordinator indicating which other devices in the wireless network are within range of the network device.

The network channel status information may include a bitmap representation indicating which other devices in the wireless network are within range of the network device.

The method may further include sending device capability information to the network coordinator indicating whether the network device can perform network control functions.

The method may be implemented in an ultra wideband device. The method may also be implemented in an integrated circuit.

Designation of a Device Designated as a Next Coordinator

Figure 7:
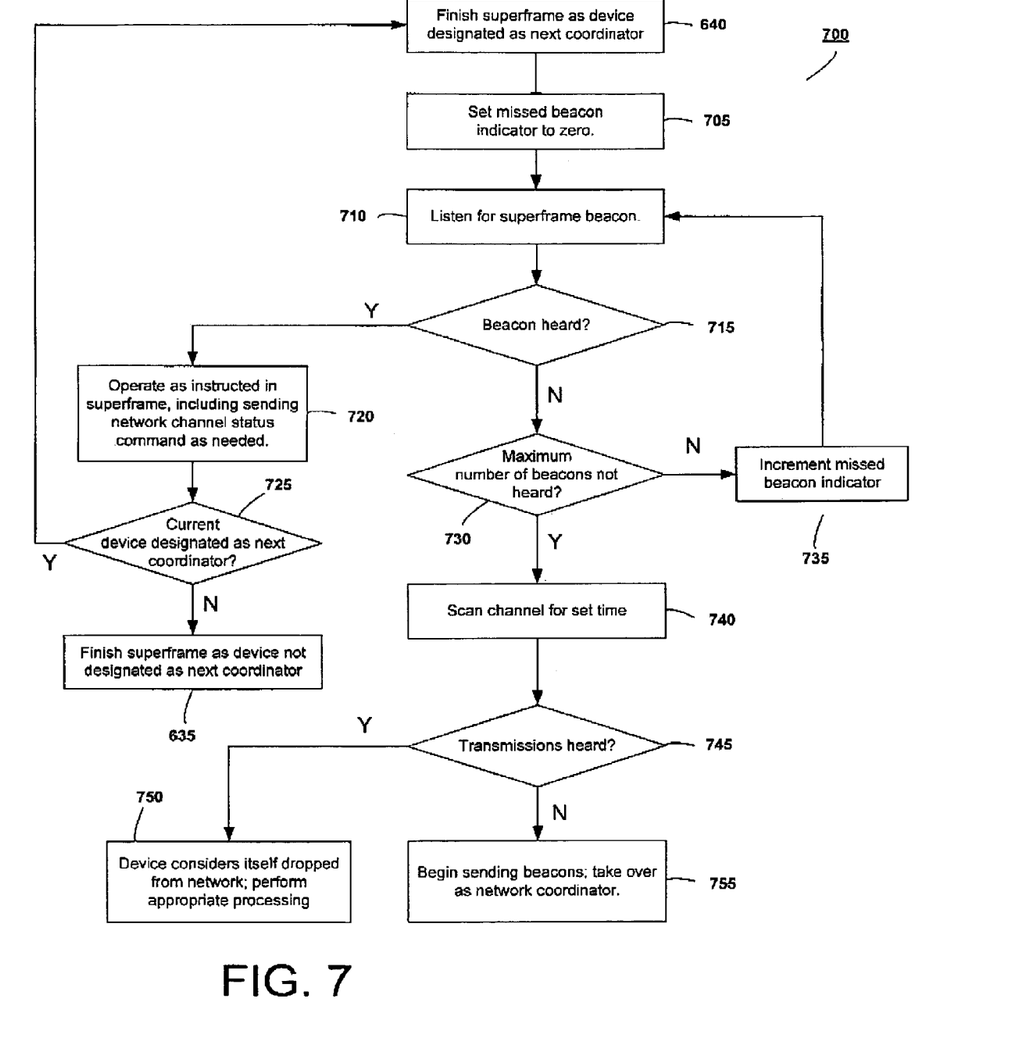
FIG. 7 is a flow chart of the operation of a device designated as a next coordinator according to a disclosed embodiment of the present invention.

FIG. 7 is a flow chart of the operation of a device designated as a next coordinator according to a disclosed embodiment of the present invention.

As shown in FIG. 7, operation starts when a device finishes a superframe as a device designated as the next network coordinator. (640) One exemplary embodiment showing how this can occur is described above with respect to FIG. 6, though alternate embodiments are also possible.

Once it finishes a superframe as a device designated as the next network coordinator, the device sets a missed beacon indicator to zero. (705) Since it has just ended a successful superframe (i.e., one in which it was designated as the next network coordinator), it has clearly not missed the most recent beacon 220.

The device then listens for a superframe beacon 220 sent from the current network coordinator (710) and determines whether the beacon 220 is heard within a set time given for receiving the beacon. (715)

If the beacon 220 is heard, the local device operates as instructed in the beacon. This includes using assigned channel time allocations, sending asynchronous frames in the CAP 230, and sending network channel status information as required. (720) As noted above with respect to FIG. 3, the network channel status information can be sent in a network channel status command in a management frame or in the CAP 230. However, alternate means of passing the network channel status information may also be employed.

The local device also determines whether the current network coordinator has designated it as the next network coordinator. (725)

If the local device has not been designated as the next network coordinator, then the device finishes the superframe as a device not designated as the next network coordinator (635), and continues processing as set forth above with respect to FIG. 6, resetting the missed beacon indicator to zero, if necessary (610), and returning to waiting for the next superframe beacon 220. (615) Because the local device was previously designated as the next network coordinator this lack of designation can only occur because another device was designated as the next network coordinator or because an explicit designation of no device as next network coordinator was made. If no designation of the next network coordinator was made during the current beacon 220, the local device will assume that it is still the designated next network coordinator.

If the local device was designated as the next network coordinator, then the device finishes the superframe as a designated next network coordinator (640), resets the missed beacon indicator to zero, if necessary (705), and returns to waiting for the next superframe beacon 220. (710)

If when determining whether the beacon was properly received (715) the local device determines that no beacon was heard, the device then determines whether the maximum number of beacons have been missed. (730)

If the maximum number of beacons have not yet been missed, the local device simply increments the missed beacon indicator and starts listening for the next beacon 220. (615)

If, however, the maximum number of beacons have been missed, the local device considers that the current network coordinator may have dropped from the network and performs the appropriate processing. In this embodiment this processing begins by having the local device scan the channel for a set period of time (e.g., the duration of a superframe). (740) This allows the local device to determine whether other devices have heard the beacon 220 and are responding accordingly by passing data between each other.

In this way the local device listens to determine whether it can hear any appropriate transmissions during the set period of time that would indicate that the network is still functioning. (745)

If it hears appropriate transmissions, the device considers itself dropped from the network and performs the appropriate processing. (750) Because the device has determined that the network is still operating, it will not automatically try and take over the network in place of the current network coordinator, despite the fact that it is designated as the next network coordinator.

If, however, the device does not hear appropriate transmissions, it will assume that the previous (formerly current) network coordinator has dropped from the network, and it will begin sending beacons 220, taking over as network coordinator. (755) If a network identifier was provided when the device was designated as the next network coordinator, it will use that network identifier for sending the new beacons 220.

In a particular disclosed embodiment, method of operating a network device is provided that includes: receiving next coordinator information from an original network coordinator designating the network device as a next network coordinator; storing a next coordinator indicator that indicates the network device is the designated next network coordinator; listening for an original beacon from the original network coordinator; determining whether the original beacon has been successfully received; determining if a maximum number of consecutive original beacons have not been received if the original beacon has not been successfully received; and sending out a new beacon and performing network control functions if a maximum number of consecutive original beacons have not been received.

The new beacon may be sent out at a different time that an original beacon would be expected from the original network coordinator.

The method may further include: determining whether the next coordinator information indicates that the network device is a designated next network coordinator if the original beacon has been successfully received; and revising the stored next coordinator indicator to indicate that the next device is not a designated next network coordinator if the next coordinator information indicates that the network device is not the designated next network coordinator.

The method may further include sending network channel status information to the original network coordinator that indicates which other devices in the wireless network are within range of the network device.

The network channel status information may include a bitmap representation indicating which other devices in the wireless network are within range of the network device.

A method of operating a network device, as recited in claim 14, wherein the method is implemented in an ultra wideband device.

The method may be implemented in an ultra wideband device. The method may also be implemented in an integrated circuit.

CONCLUSION

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled. The various circuits described above can be implemented in discrete circuits or integrated circuits, as desired by implementation.

What is claimed is:

1. A. method of operating a network coordinator, comprising:
   receiving device capability information from a plurality of network devices, including whether each of the plurality of network devices can perform network control functions;
   determining whether any of the plurality of network devices is capable of performing network control functions based on the device capability information;
   receiving network channel status information from one or more of the plurality of network devices in management frames assigned to the one or more of the plurality of network devices, respectively, the network channel status information indicating which of the plurality of network devices are within range of a transmitting device;
   choosing one of the plurality of network devices that is capable of performing network control functions to be a designated next coordinator based on the network channel status information, if any of the plurality of network devices are capable of performing network control functions;

determining that there will be no designated next coordinator if none of the plurality of network devices are capable of performing network control functions; and sending a beacon to the plurality of network devices, the beacon including next coordinator information indicating one of: the designated next coordinator, or that there is no designated next coordinator.

2. A method of operating a network coordinator, as recited in claim 1, wherein the network channel status information include a bitmap representation of which of the plurality of network devices are within range of the transmitting device.

3. A method of operating a network coordinator, as recited in claim 1, wherein the next coordinator information includes one of: a device identifier for the designated next coordinator, or a null value indicating no designated next coordinator.

4. A method of operating a network coordinator, as recited in claim 3, wherein the next coordinator information includes a network identifier to be used by the designate next coordinator to create a new network.

5. A method of operating a network coordinator, as recited in claim 1, wherein the next coordinator information includes a network identifier to be used by the designated next coordinator to create a new network.

6. A method of operating a network coordinator, as recited in claim 1, wherein the method is implemented in an ultra wideband device.

7. A method of operating a network coordinator, as recited in claim 1, wherein the method is implemented in an integrated circuit.

8. A method of operating a local network device, comprising:

listening for a beacon from a network coordinator;

listening to transmissions from one or more remote network devices in management frames assigned to the one or more remote network devices, respectively;

determining network channel status information regarding the one or more remote network devices based on the transmissions from the one or more remote network devices, the channel status information indicating which of the one or more remote network devices are within range of the local network device;

determining whether the beacon has been successfully received;

determining whether the beacon indicates that the network device is a designated next network coordinator;

storing a next device indicator indicating that the local network device is the designated next network coordinator if the beacon indicates that the local network device is the designated next network coordinator; and operating in a superframe in accordance with instructions in the beacon, when the beacon has been successfully received, wherein while operating in the superframe, the local network device sends the network channel status information to the network coordinator in a management time frame assigned to the local network device.

9. A method of operating a local network device, as recited in claim 8, wherein the network channel status information includes a bitmap representation indicating which other devices in the wireless network are within range of the local network device.

10. A method of operating a local network device, as recited in claim 8, further comprising sending device capability information to the network coordinator indicating whether the local network device can perform network control functions.

11. A method of operating a local network device, as recited in claim 8, wherein the method is implemented in an ultra wideband device.

12. A method of operating a local network device, as recited in claim 8, wherein the method is implemented in an integrated circuit.

13. A method of operating a network device, comprising:

receiving next coordinator information from an original network coordinator designating the network device as a next network coordinator;

storing a next coordinator indicator that indicates the network device is the designated next network coordinator;

listening for an original beacon from the original network coordinator;

determining whether the original beacon has been successfully received;

determining if a maximum number of consecutive original beacons have not been received if the original beacon has not been successfully received;

sending out a new beacon and performing network control functions if a maximum number of consecutive original beacons have not been received; and scanning a network channel for transmissions from one or more non-coordinator devices in the network, wherein the sending out of the new beacon and the performing of network control functions is only performed if a maximum number of consecutive original beacons have not been received, and the scanning of the network channel detects no transmissions from the one or more non-coordinator devices in the network.

14. A method of operating a network device, as recited in claim 13, wherein the new beacon is sent out at a different time that an original beacon would be expected from the original network coordinator.

15. A method of operating a network device, as recited in claim 13, further comprising:

determining whether the next coordinator information indicates that the network device is a designated next network coordinator if the original beacon has been successfully received; and revising the stored next coordinator indicator to indicate that the next device is not a designated next network coordinator if the next coordinator information indicates that the network device is not the designated next network coordinator.

16. A method of operating a network device, as recited in claim 13, further comprising sending network channel status information to the original network coordinator that indicates which other devices in the wireless network are within range of the network device.

17. A method of operating a network device, as recited in claim 16, the network channel status information includes a bitmap representation indicating which other devices in the wireless network are within range of the network device.

18. A method of operating a network device, as recited in claim 13, wherein the method is implemented in an ultra wideband device.

19. A method of operating a network device, as recited in claim 13, wherein the method is implemented in an integrated circuit.

* * * * *